(12) United States Patent
Parks et al.

(10) Patent No.: US 8,717,476 B2
(45) Date of Patent: May 6, 2014

(54) IMAGE SENSOR PIXEL WITH GAIN CONTROL

(75) Inventors: Christopher Parks, Rochester, NY (US); John T. Compton, LeRoy, NY (US)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 13/418,182

(22) Filed: Mar. 12, 2012

(65) Prior Publication Data

US 2012/0168611 A1 Jul. 5, 2012

Related U.S. Application Data

(62) Division of application No. 11/742,883, filed on May 1, 2007, now Pat. No. 8,159,585.

(51) Int. Cl.
*H04N 3/14* (2006.01)
*H04N 5/335* (2011.01)
*H04N 5/20* (2006.01)

(52) U.S. Cl.
USPC .......................................... 348/308; 348/255

(58) Field of Classification Search
USPC ................................ 348/281, 307, 229.1, 255
See application file for complete search history.

(56) References Cited

U.S. PATENT DOCUMENTS

| | | | |
|---|---|---|---|
| 6,310,369 B1 | 10/2001 | Narabu et al. | |
| 6,730,897 B2 | 5/2004 | Guidash | |
| 6,960,796 B2 | 11/2005 | Rhodes et al. | |
| 7,075,049 B2 | 7/2006 | Rhodes et al. | |
| 7,091,531 B2 | 8/2006 | Boemler | |
| 7,800,673 B2 | 9/2010 | Sugawa et al. | |
| 7,956,908 B2 | 6/2011 | Kim | |
| 2004/0251394 A1 | 12/2004 | Rhodes et al. | |
| 2004/0262493 A1* | 12/2004 | Suzuki | 250/208.1 |

(Continued)

FOREIGN PATENT DOCUMENTS

| | | |
|---|---|---|
| CN | 1833429 A | 9/2006 |
| EP | 1643755 | 4/2006 |

(Continued)

OTHER PUBLICATIONS

EP 09176344.1—Search Report, dated Apr. 24, 2012 (4 pages).

(Continued)

*Primary Examiner* — Albert Cutler
(74) *Attorney, Agent, or Firm* — Blakely Sokoloff Taylor & Zafman LLP

(57) ABSTRACT

A method for reading out an image signal includes providing at least two photosensitive regions and providing at least two transfer gates respectively associated with each photosensitive region. The method also includes providing a common charge-to-voltage conversion region electrically connected to the transfer gates and providing a reset mechanism that resets the common charge-to-voltage conversion region. After transferring charge from at least one of the photo-sensitive regions, all the transfer gates are disabled at a first time. The method further includes enabling at least one transfer gate at a subsequent second time and transferring charge from at least one of the photosensitive regions at a subsequent third time while the at least one transfer gate from the second time remains enabled.

8 Claims, 11 Drawing Sheets

(56) References Cited

U.S. PATENT DOCUMENTS

| | | | |
|---|---|---|---|
| 2005/0092894 A1 | 5/2005 | Fossum | |
| 2006/0013485 A1* | 1/2006 | Nitta et al. | 382/194 |
| 2006/0103749 A1 | 5/2006 | He | |
| 2006/0256221 A1 | 11/2006 | McKee et al. | |
| 2006/0273240 A1* | 12/2006 | Guidash et al. | 250/208.1 |
| 2007/0120982 A1* | 5/2007 | Oita et al. | 348/207.99 |
| 2007/0131993 A1* | 6/2007 | Oita et al. | 257/292 |

FOREIGN PATENT DOCUMENTS

| | | | |
|---|---|---|---|
| JP | 2000-152086 | | 5/2000 |
| JP | 2000152086 | * | 5/2000 |
| JP | 2000-165754 A | | 6/2000 |
| JP | 2007-201863 A | | 8/2007 |
| KR | 2007-0023798 A | | 2/2007 |
| TW | 200625927 A | | 7/2006 |

OTHER PUBLICATIONS

CN 200880014156.8—Chinese Notice of Reexamination, issued Mar. 4, 2013, with English Translation (9 pages).
EP 08743163.1—Examination Report, issued Apr. 4, 2012 (5 pages).
CN 200880014156.8—First Chinese Office Action, issued Sep. 2, 2010, with English Translation (15 pages).
CN 200880014156.8—Chinese Decision of Rejection, issued Jul. 14, 2011, with English Translation (13 pages).
KR 2009-7022858—Korean Notice of Preliminary Rejection, issued Sep. 13, 2013, with English Translation (7 pages).
CN 200880014156.8—Second Office Action, issued Dec. 2, 2013, with English Translation (7 pages).
JP 2010-506226—First Japanese Office Action, issued Jul. 31, 2012, with English translation (6 pages).
TW 097116019—First Office Action, issued Feb. 21, 2014, with English Translation (9 pages).

* cited by examiner

IMAGE SENSOR PIXEL WITH GAIN CONTROL

REFERENCE TO PRIOR APPLICATIONS

This application is a divisional and claims priority to U.S. application Ser. No. 11/742,883, filed May 1, 2007, now pending.

FIELD OF THE INVENTION

The invention relates generally to the field of image sensors and, more particularly, to such image sensors having variable gain control.

BACKGROUND OF THE INVENTION

FIG. 1 shows the typical CMOS active pixel image sensor 100. The basic component of the image sensor 100 is the array of photosensitive pixels 130. The row decoder circuitry 105 selects an entire row of pixels 130 to be sampled by the correlated double sampling (CDS) circuitry 125. The analog-to-digital converter 115 scans across the column decoders and digitizes the signals stored in the CDS 125. The analog-to-digital converter 115 may be of the type which has one converter for each column (parallel) or one high-speed converter to digitize each column serially. The digitized data may be directly output from the image sensor 100 or there may be integrated image processing 120 for defect correction, color filter interpolation, image scaling, and other special effects. The timing generator 110 controls the row and column decoders to sample the entire pixel array or only a portion of the pixel array.

FIG. 2 shows one pixel of a CMOS image sensor 100. There is a photodiode 151 to collect photo-generated electrons. When the signal is read from the photodiode 151 the RG signal is pulsed to reset the floating diffusion node 155 to the VDD potential through the reset transistor 150. The row select signal RSEL is turned on to connect the output transistor 153 to the output signal line through the row select transistor 154. CDS circuit 125 samples the reset voltage level on the output signal line. Next, the transfer transistor 152 is pulsed on and off to transfer charge from the photodiode 151 to the floating diffusion 155. The new voltage level on the output signal line minus the reset voltage level is proportional to the amount of charge on the floating diffusion.

The magnitude of the floating diffusion voltage change is given by $V=Q/C$ where Q is the amount of charge collected by the photodiode 151 and C is the capacitance of the floating diffusion node 155. If the capacitance C is too small and the charge Q is too large, then the voltage output will be too large for the CDS circuit 125. This problem commonly occurs when the pixel size is 2.7 µm or larger and the power supply voltage VDD is 3.3 V or less. The prior art solution to this problem has generally consisted of placing extra capacitance on the floating diffusion node 155.

In FIG. 3, U.S. Pat. No. 6,730,897 discloses increasing the floating diffusion node 160 capacitance by adding a capacitor 161 connected between the floating diffusion 160 and GND. In FIG. 4, U.S. Pat. No. 6,960,796 discloses increasing the floating diffusion node 162 capacitance by adding a capacitor 163 connected between the floating diffusion 162 and the power supply VDD. The prior art does increase the floating diffusion node capacitance enough to ensure the maximum output voltage is within the power supply limit at maximum photodiode charge capacity. However, the prior art solution is not optimum for low light level conditions. When there is a very small amount of charge in the photodiode, the larger floating diffusion capacitance lowers the voltage output making it harder to measure small signals. A need exists to have a small floating diffusion capacitance (for increased voltage output) when imaging in low light levels and a large floating diffusion capacitance (to lower voltage output below the power supply range) when imaging in high light levels. This is a form of gain control within the pixel.

FIG. 5 shows a pixel with an extra "dangling" transistor 165 connected to the floating diffusion node 166. This pixel is from US Patent Application Publication 2006/0103749A1. Switching on the transistor 165 with the AUX signal line increases the capacitance of the floating diffusion 166. This method of changing the floating diffusion capacitance requires four transistor gates 165, 167, 168, and 169 to closely surround and directly electrically connected to the floating diffusion node 166. The presence of four transistor gates does not allow for the smallest possible floating diffusion node capacitance. When the transistor 165 is turned off, the gate still adds some additional capacitance compared to the case where only three transistors are adjacent to the floating diffusion.

U.S. Pat. No. 7,075,049 also shows pixels with the ability to change the floating diffusion node capacitance. It also has the requirement of four transistors adjacent to the floating diffusion node. Therefore, the pixel designs in U.S. Pat. No. 7,075,049 does not provide for the smallest possible floating diffusion capacitance.

The present invention discloses a pixel where the floating diffusion capacitance can be changed. Furthermore, the present invention will only require three transistor gates to be adjacent to the floating diffusion and not require additional signal lines be added to the pixel.

SUMMARY OF THE INVENTION

The present invention is directed to overcoming one or more of the problems set forth above. Briefly summarized, according to one aspect of the present invention, described is a method for reading out an image signal, the method comprising: providing at least two photosensitive regions; providing at least two transfer gates respectively associated with each photosensitive region; providing a common charge-to-voltage conversion region electrically connected to the transfer gates; providing a reset mechanism that resets the common charge-to-voltage conversion region; after transferring charge from at least one of the photo-sensitive regions, disabling all transfer gates at a first time; enabling at least one transfer gate at a subsequent second time; and transferring charge from at least one of the photosensitive regions at a subsequent third time while the at least one transfer gate from the second time remains enabled.

The above and other objects of the present invention will become more apparent when taken in conjunction with the following description and drawings wherein identical reference numerals have been used, where possible, to designate identical elements that are common to the figures.

ADVANTAGEOUS EFFECT OF THE INVENTION

The present invention has the following advantage of variable gain control having only three transistor gates adjacent the floating diffusion and does not require additional signal lines.

DETAILED DESCRIPTION OF THE INVENTION

Before discussing the present invention in detail, it is instructive to note that the present invention is preferably used in, but not limited to, a CMOS active pixel sensor. Active pixel sensor refers to an active electrical element within the pixel, other than transistors functioning as switches. For example, the floating diffusion or amplifiers are active elements. CMOS refers to complementary metal oxide silicon type electrical components such as transistors which are associated with the pixel, but typically not in the pixel, and which are formed when the source/drain of a transistor is of one dopant type (for example p-type) and its mated transistor is of the opposite dopant type (for example n-type). CMOS devices include some advantages one of which is it consumes less power.

Figure 1:
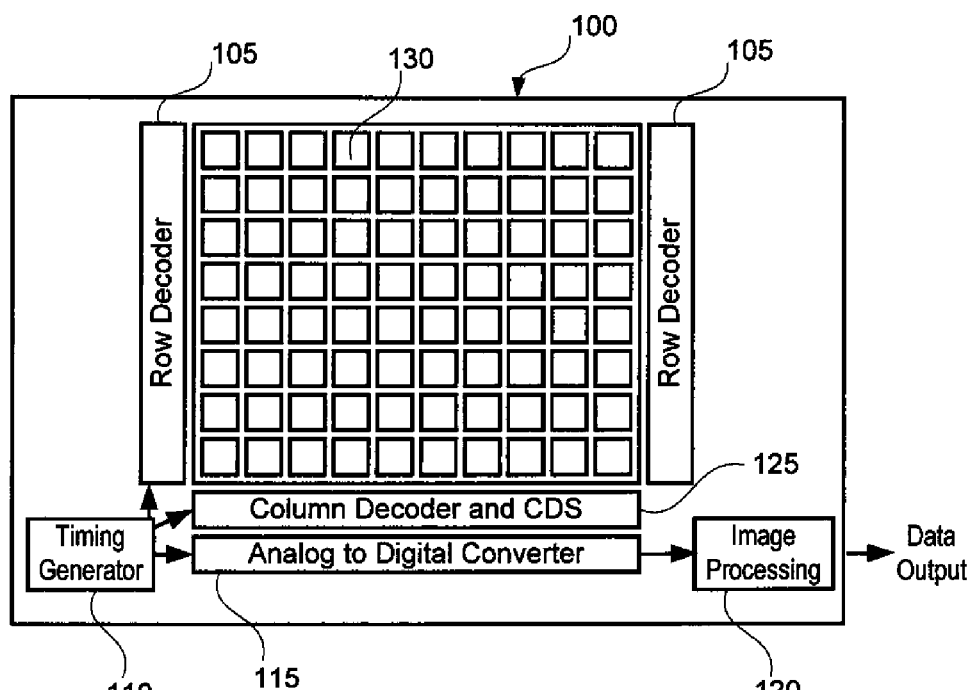
FIG. 1 is a prior art CMOS active pixel image sensor.
Figure 2:
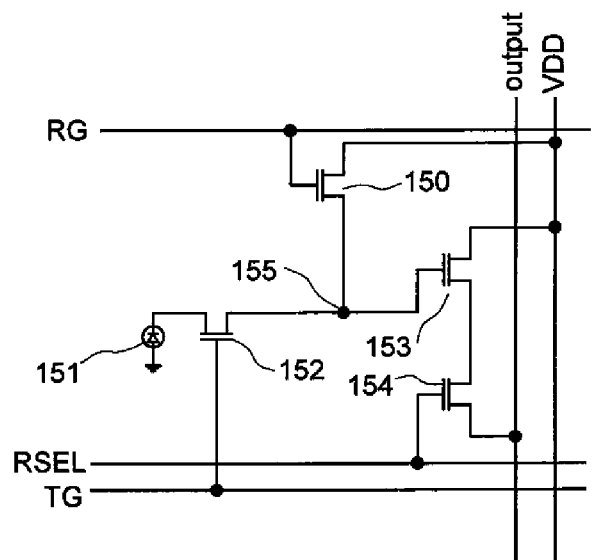
FIG. 2 is a schematic of a prior art CMOS active pixel.
Figure 3:
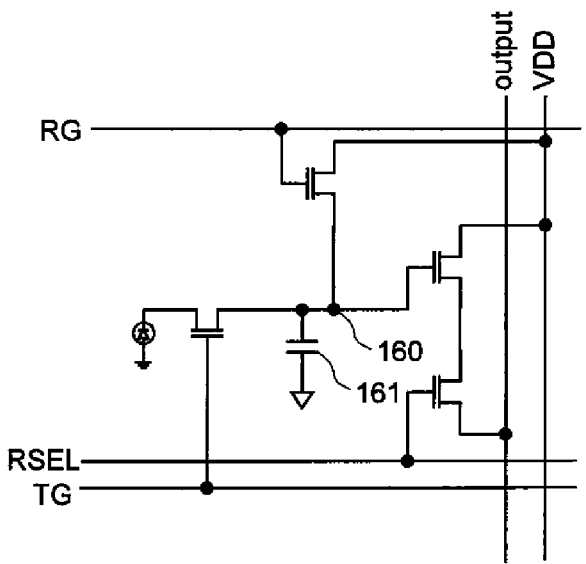
FIG. 3 is a schematic of a prior art CMOS active pixel with a capacitor to GND to reduce charge conversion gain.
Figure 4:
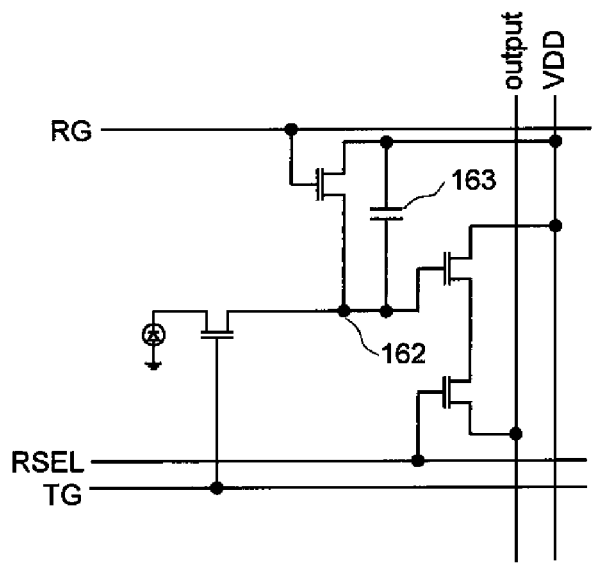
FIG. 4 is a schematic of a prior art CMOS active pixel with a capacitor to VDD to reduce charge conversion gain.
Figure 5:
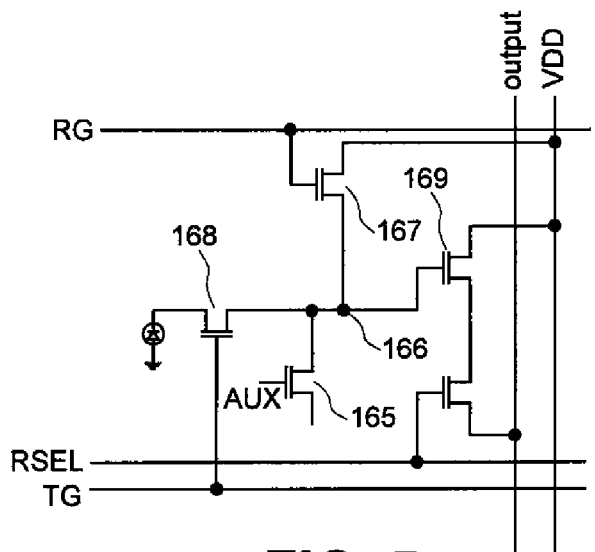
FIG. 5 is a schematic of a prior art CMOS active pixel with a dangling transistor to reduce charge conversion gain.
Figure 6:
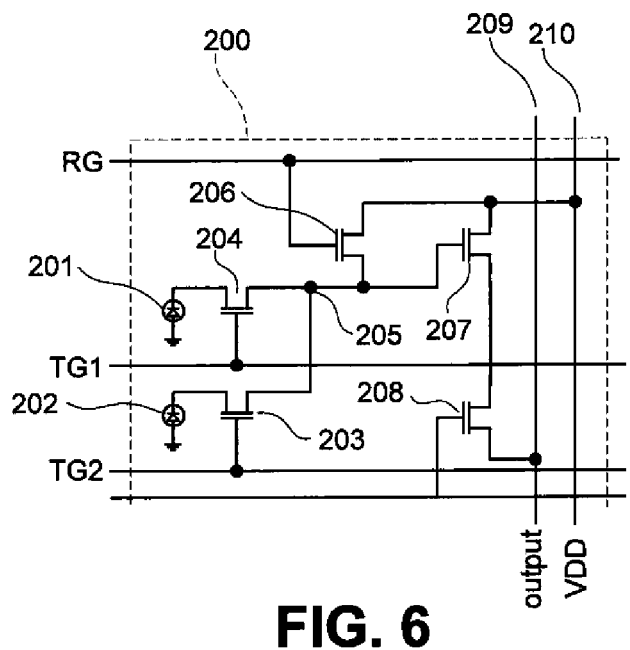
FIG. 6 is a schematic of a CMOS active pixel sensor used in the present invention.

FIG. 6 shows a CMOS pixel 200 capable of implementing the invention. It has two photosensitive regions shown as photodiodes 201 and 202. Each photodiode 201 and 202 is connected to a common charge-to-voltage conversion node 205 by transfer gates 203 and 204. Reset transistor 206 is used to set the charge-to-voltage conversion node 205 to the power supply voltage 210. The output transistor 207 is used to drive the output signal line 209 when the row select transistor 208 is enabled.

Figure 7:
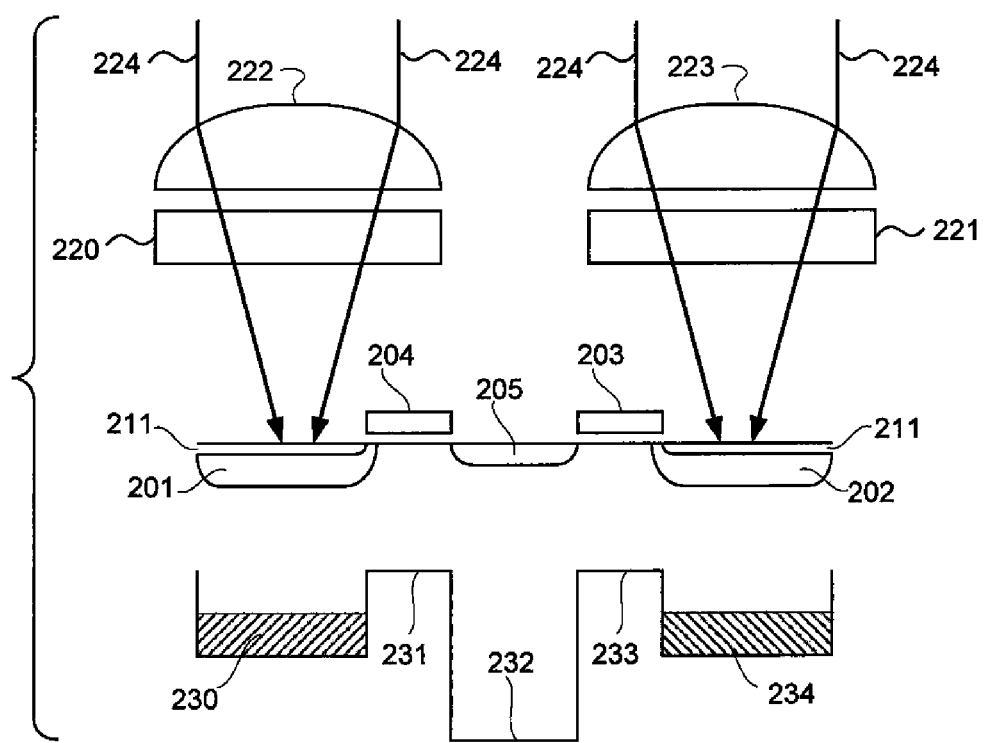
FIG. 7 is a cross section of a CMOS active pixel sensor showing the photodiodes, transfer gates and charge-to-voltage conversion region.

FIG. 7 shows a horizontal cross-section through the fabricated pixel 200. The transfer gates 204 and 203 are shown surrounding an implanted diffusion serving as the charge-to-voltage conversion node 205. The photodiode implants 201 and 202 are below a surface pinning layer implant 211. This type of photodiode is commonly referred to as a pinned photodiode. Above each pixel is a color filter material 220 and 221 that are of the same or different colors. An array of microlenses 222 and 223 focus light rays 224 into the photodiode areas of the pixel.

Under the cross-section in FIG. 7, there is shown the electric channel potentials under the various regions of the pixel 200. 231 is the channel potential under the transfer gate 204 when the transfer gate is in the off state. 233 is the channel potential under the transfer gate 203 when the transfer gate is in the off state. 232 is the channel potential of the charge-to-voltage conversion node 205 after node 205 has been reset by transistor 206 (as shown in FIG. 6). Areas 230 and 234 represent the amount of photo-generated charge in the photodiodes 201 and 202.

Figure 8:
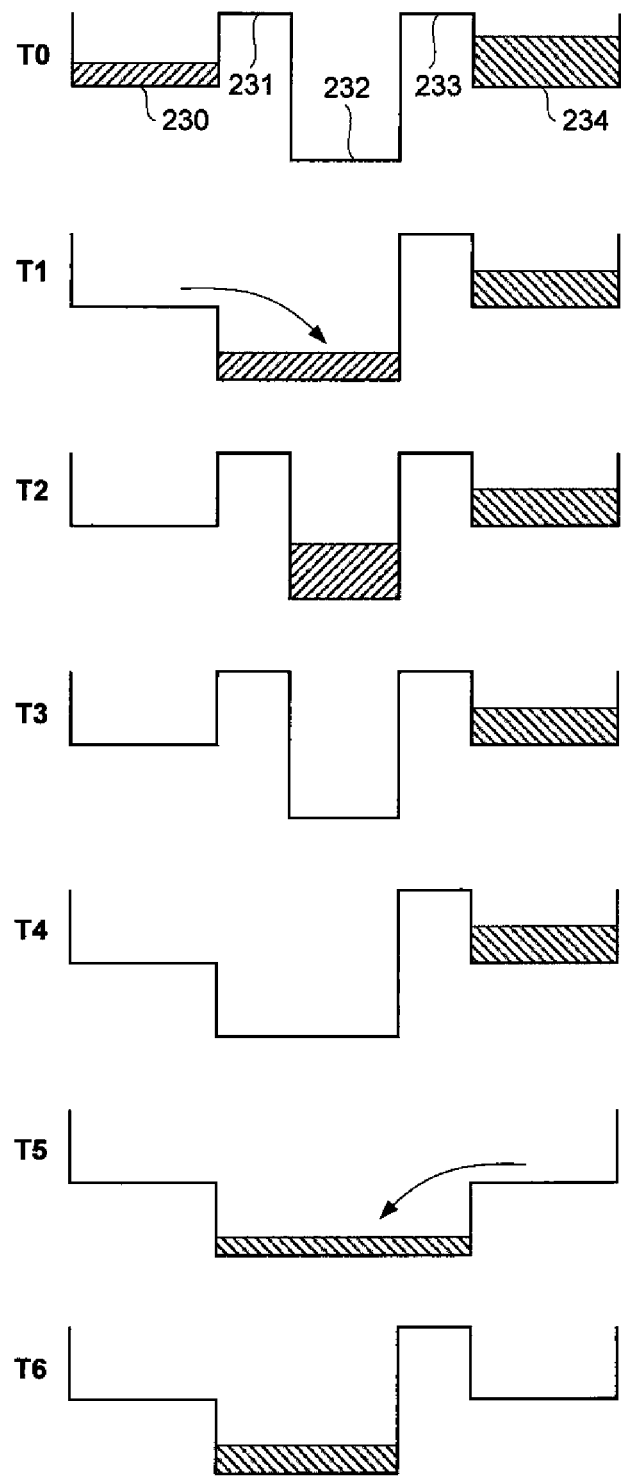
FIG. 8 shows the channel potentials of the transfer gates and charge-to-voltage conversion region for the first embodiment of the present invention.

In FIG. 8, there is shown only the channel potential diagram of FIG. 7 at the various time steps of sampling the photo-generated charge 230, 234 in the photodiodes 201, 202. The process of sampling the photo-generated charge 230, 234 in the photodiodes 201, 202 begins at time step T0 where one photodiode charge 230 is less than the other photodiode charge 234.

The reason for the difference of charge, for example, might be caused by photodiode 202 having a longer integration time or color filter 221 might be more transparent or pass a wider range of colors. Microlens 223 may also be fabricated to collect more light than microlens 222. Any of these features may be incorporated into the present invention. Time step T0 is after the charge-to-voltage conversion region 205 has been reset to channel potential 232. The reset voltage of the charge-to-voltage conversion region 205 is also sampled at this time. At time step T1 transfer gate 204 is turned on to transfer charge 230 to the charge-to-voltage conversion region 205. Next, at time step T2, transfer gate 204 is turned off and the new voltage on the charge-to-voltage conversion region 205 is sampled and subtracted from the reset voltage level to measure the amount of charge 230. At time step T3 the charge-to-voltage conversion region is reset again and the reset voltage level is sampled. At time step T4 transfer gate 204 is turned on to a voltage level that increases the capacitance of the charge-to-voltage conversion region 205. The charge-to-voltage conversion region 205 may be reset at time step T4 instead of time step T3. The transfer gate 204 is still on when transfer gate 203 is also turned on at time step T5 to transfer charge 234 to the charge-to-voltage conversion region 205. When transfer gate 203 is turned off in time step T6 the charge 234 spreads out over a larger area that has a higher capacitance than when transfer gate 204 was off in time step T2.

Now consider the relationship between charge, Q, capacitance, C, and voltage, V given by $V=Q/C$. A higher capacitance means there will be less voltage change on the charge-to-voltage conversion region so it can hold a larger amount of charge. Higher capacitance corresponds to less charge-to-voltage conversion gain. Thus, the present invention can sample small amounts of charge with high gain with both transfer gates turned off and it can also sample large amounts of charge with one of the transfer gates turned on.

It is advantageous to transfer charge from the photodiode with the most charge last because that is the time at which the charge-to-voltage conversion region can have the highest capacitance by turning on transfer gates from empty photodiodes. It is also obvious that the invention can be extended to pixels that share more than two photodiodes. It is also obvious that, with more than two photodiodes, there can be more than two levels of charge-to-voltage conversion region capacitance control.

Figure 9:
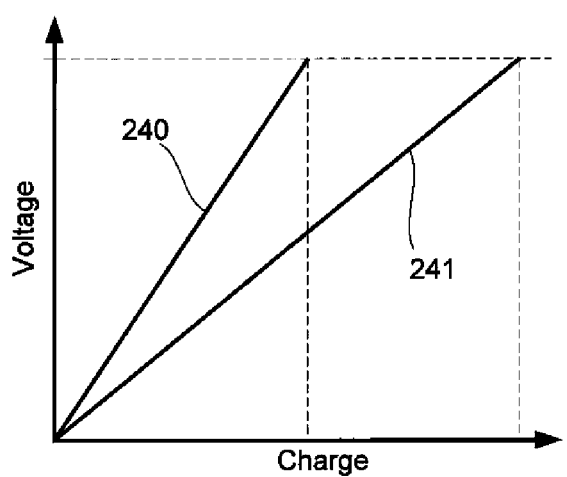
FIG. 9 shows the linearity curves of the first embodiment of the present invention.

FIG. 9 shows the output voltage of the pixel vs. the amount of charge collected in a photodiode. When charge is sampled with both transfer gates turned off, the pixel is in high gain mode and produces output voltage curve 240 which reaches saturation at low charge levels. When charge is sampled with one transfer gate turned on, the pixel is in low gain mode and produces output voltage curve 241, which reaches saturation at higher charge levels.

Figure 10:
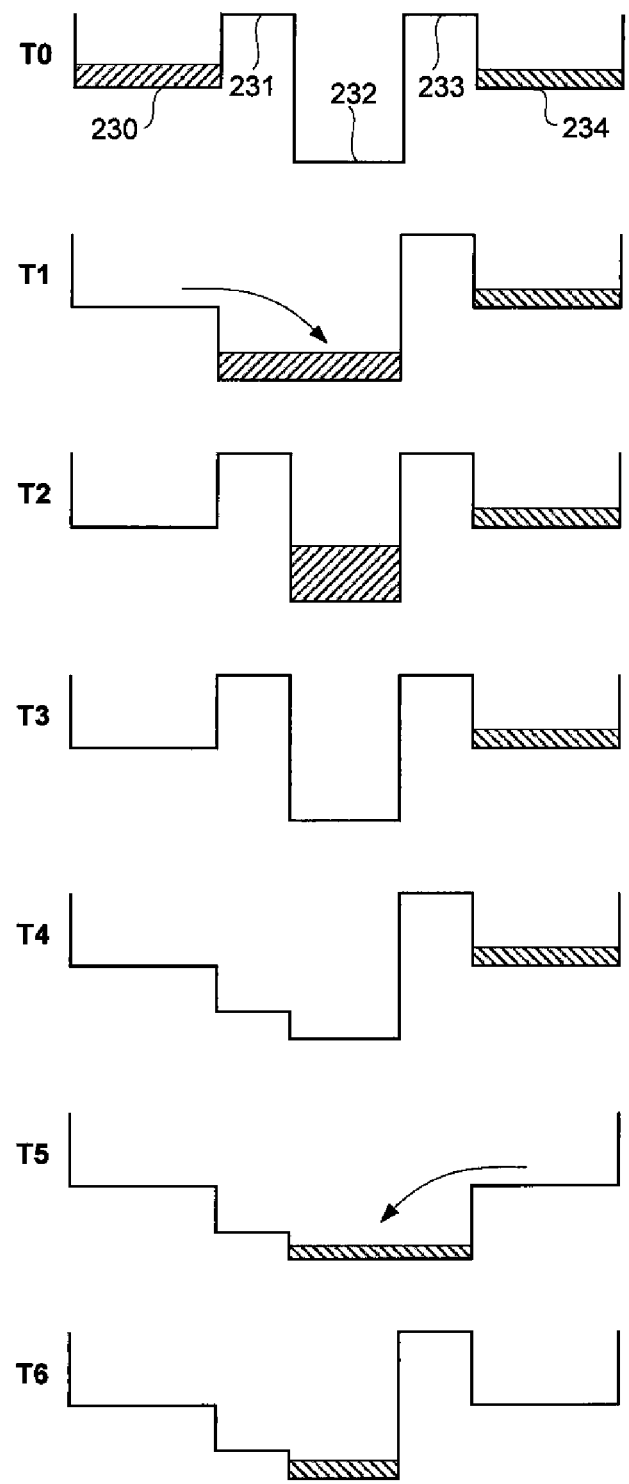
FIG. 10 shows the channel potentials of the transfer gates and charge-to-voltage conversion region for the second embodiment of the present invention when a small charge is measured.

In the second embodiment of the present invention, the pixel structure is the same as shown in FIGS. 7 and 8 but the operation of the transfer gates is different. In FIG. 10, time step T0 is after the charge-to-voltage conversion region 205 has been reset to channel potential 232. The reset voltage of the charge-to-voltage conversion region 205 is also sampled at this time. At time step T1 transfer gate 204 is turned on to transfer charge 230 to the charge-to-voltage conversion region 205. Next, at time step T2, transfer gate 204 is turned off and the new voltage on the charge-to-voltage conversion region 205 is sampled and subtracted from the reset voltage level to measure the amount of charge 230. At time step T3 the charge-to-voltage conversion region 205 is reset again and the reset voltage level is sampled. At time step T4 transfer gate 204 is partially turned on to a voltage level that sets the transfer gate channel potential 231 between the photodiode channel potential and the reset voltage level potential 232. At time step T5 transfer gate 203 is turned on to transfer charge 234 to the charge-to-voltage conversion region 205 and then the transfer gate 203 is turned off at time step T6.

Figure 11:
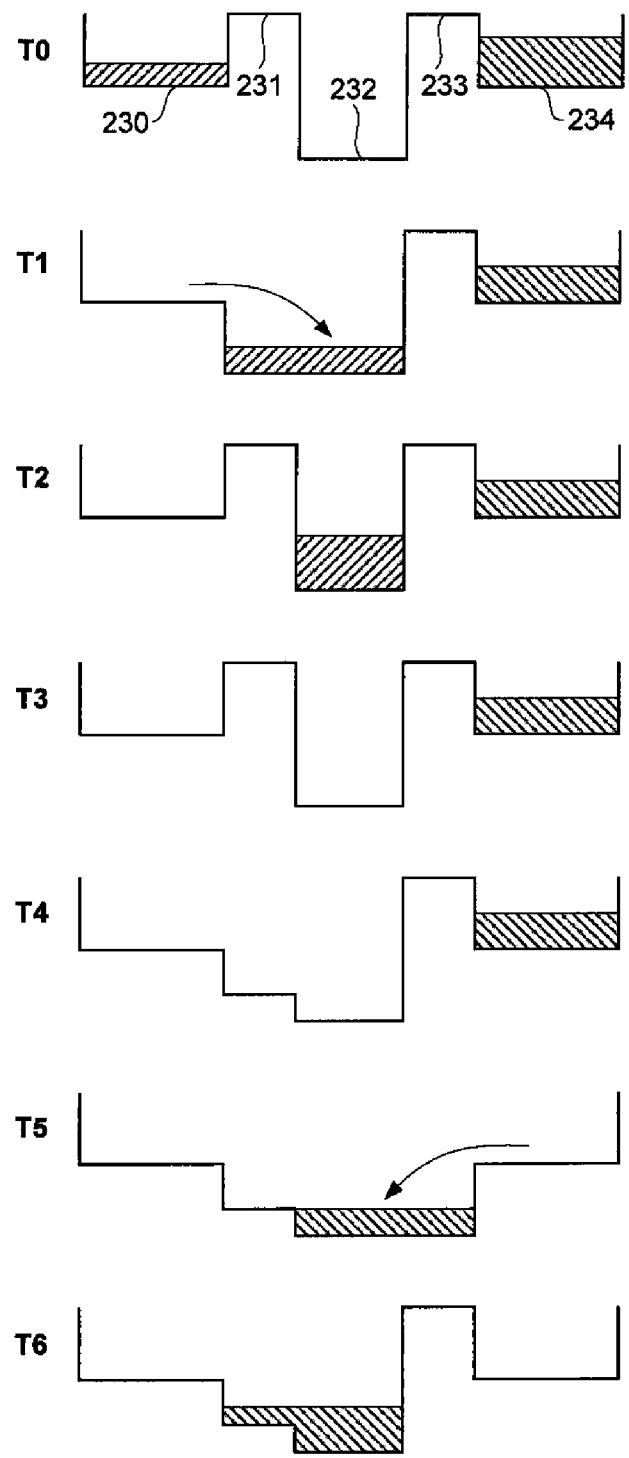
FIG. 11 shows the channel potentials of the transfer gates and charge-to-voltage conversion region for the second embodiment of the present invention when a large charge is measured.

The advantage of the partial turn on of the transfer gate 204 is the charge-to-voltage conversion region capacitance will be high for small charge and the capacitance will be low for large charge. FIG. 10 shows a case where the charge 234 is small and does not fill up the charge-to-voltage conversion region 205 beyond the transfer gate 204 channel potential 231 at time step T6. Therefore in this case the charge 234 is measured with a low capacitance high voltage conversion gain. In the case of FIG. 11, the charge 234 is large and when it is transferred to the charge-to-voltage conversion region 205 it flows on top of the channel potential 231 at time step T6. Now the large charge 234 is measured with a large capacitance lower voltage conversion gain.

Figure 12:
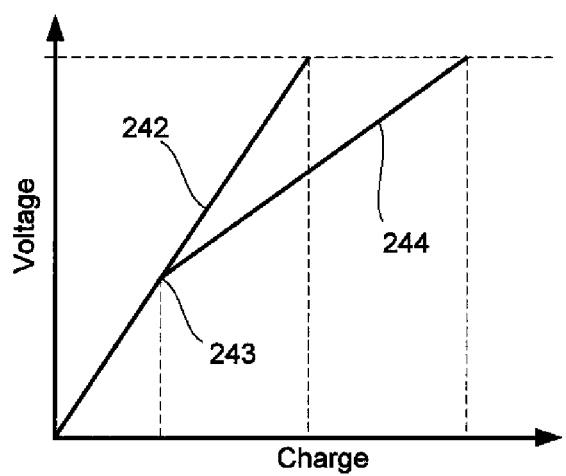
FIG. 12 shows the linearity curves of the second embodiment of the present invention.

FIG. 12 shows the voltage response of the charge-to-voltage conversion region 205 in the second embodiment vs. the amount of charge collected in the photodiode. When the charge is large, above point 243, then the slope of the voltage response decreases and follows curve 244. If the transfer gate 204 had been turned off instead of partially turned on, the voltage response would have followed the higher gain curve 242. The second embodiment allows for high gain at low signal levels and low gain at high signal levels.

Figure 13:
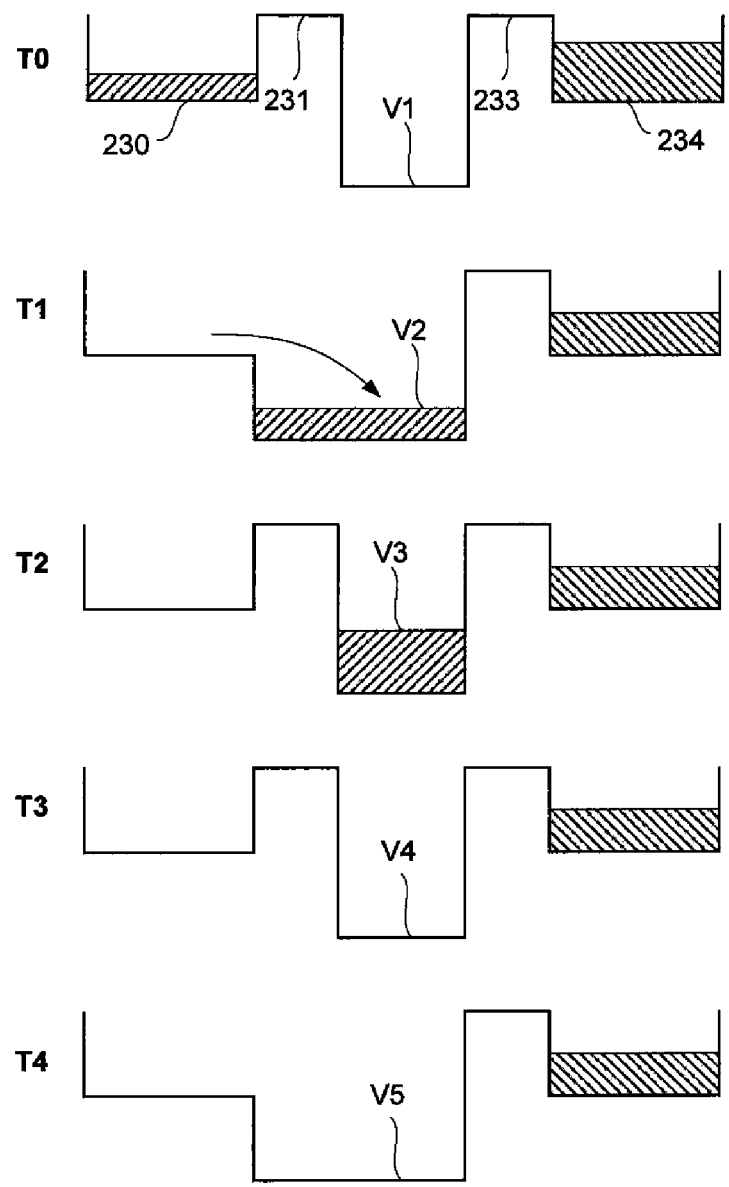
FIG. 13 shows the channel potentials of the transfer gates and charge-to-voltage conversion region for the third embodiment of the present invention.

In the third embodiment of the present invention, the pixel structure is the same as shown in FIGS. 7 and 8 but the operation of the transfer gates is different. The third embodiment of the present invention is illustrated in FIG. 13. At time step T0 the charge-to-voltage conversion region 205 has just been reset and its voltage sampled as V1. At time T1 transfer gate 204 is turned on to transfer charge 230 to the charge-to-voltage conversion region 205. While the transfer gate 204 is still on, the charge-to-voltage conversion region 205 voltage is sampled as V2. A time step T2 the transfer gate 204 is turned off and the charge-to-voltage conversion region 205 voltage is sampled as V3.

The voltage V3-V1 represents the high conversion gain measurement of the charge 230. The voltage V2-V1 represents the low conversion gain measurement of the charge 230. However, V2-V1 includes an offset error caused by the capacitive coupling of the transfer gate 204 to the charge-to-voltage conversion region 205. To remove this offset error, the charge-to-voltage conversion region 205 is again reset at time step T3 and its voltage is measured as V4. Next at time step T4 the transfer gate 204 is turned on again and held on while the charge-to-voltage conversion region 205 voltage is measured as V5. By measuring V5 when there was no charge in the photodiode 201, the offset error is obtained as V5-V4. Now the correct low conversion gain measurement is V2-V1-(V5-V4).

For a less accurate measurement voltage V4 may be eliminated and V1 used in its place. In this case the low conversion gain measurement is V2-V1-(V5-V1) or V2-2V1-V5.

The third embodiment can be applied to a CMOS active pixel that has any number of photodiodes sharing a common charge-to-voltage conversion region. The steps of FIG. 13 are repeated for each one of the photodiodes.

The advantage of the third embodiment is every pixel of the image sensor is sampled with both a high and low charge-to-voltage conversion gain. An advantage of all embodiments of the invention is they do not require the addition of any transistors or signal wires.

Figure 14:
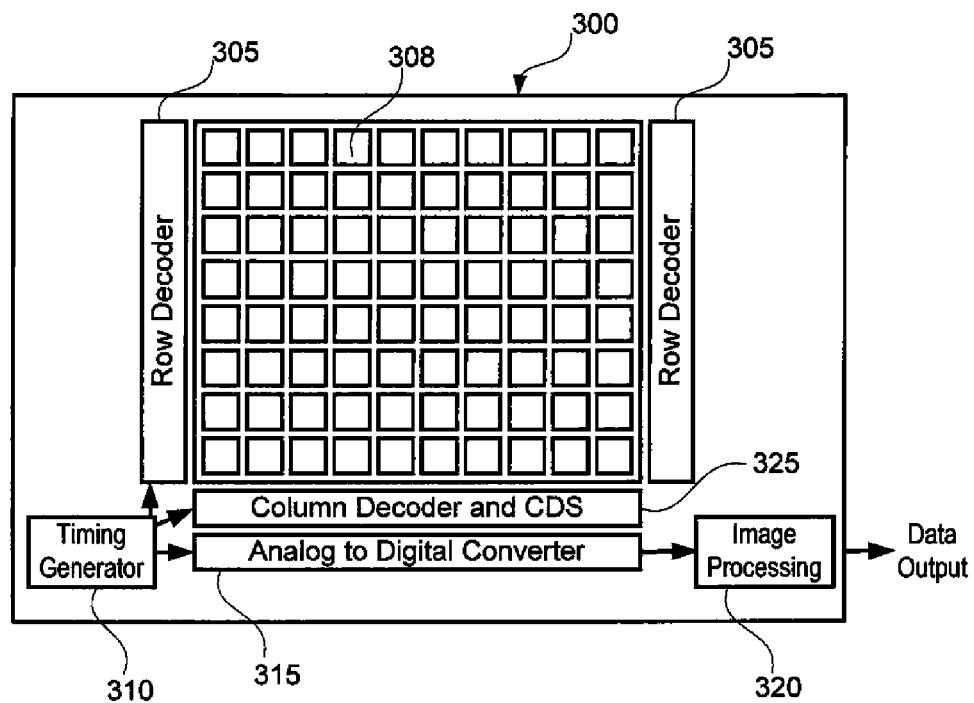
FIG. 14 is a CMOS active pixel image sensor employing a pixel using the present invention.

FIG. 14 shows a CMOS active pixel image sensor 300 of the present invention having a pixel 308 where its transfer gates are operated with charge-to-voltage conversion gain control of the present invention. The basic component of the image sensor 300 is the array of photosensitive pixels 308. The row decoder circuitry 305 selects an entire row of pixel 308 to be sampled by the correlated double sampling (CDS) circuitry 325. The analog-to-digital converter 315 scans across the column decoders and digitizes the signals stored in the CDS. The analog-to-digital converter 315 may be of the type that has one converter for each column (parallel) or one high-speed converter to digitize each column serially. The digitized data may be directly output from the image sensor 300 or there may be integrated image processing 320 for defect correction, color filter interpolation, image scaling, and other special effects. The timing generator 310 controls the row and column decoders to sample the entire pixel array or only a portion of the pixel array.

Figure 15:
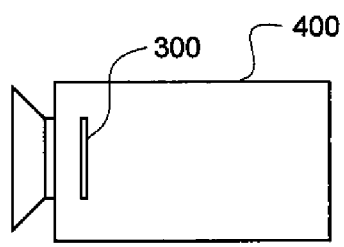
FIG. 15 is a digital camera using a CMOS active pixel image sensor employing a pixel with the present invention.

FIG. 15 shows the image sensor 300 employing a pixel where its transfer gates are operated with charge-to-voltage conversion gain control in an electronic imaging system, preferably a digital camera 400.

The present invention has been described with reference to a preferred embodiment. However, it will be appreciated that variations and modifications can be effected by a person of ordinary skill in the art without departing from the scope of the invention.

PARTS LIST 100 image sensor
105 row decoder circuitry
110 timing generator
115 analog-to-digital converter
120 integrated image processing
125 correlated double sampling (CDS) circuitry
130 photosensitive pixel
150 reset transistor
151 photodiode
152 transfer transistor
153 output transistor
154 row select transistor
155 floating diffusion node
160 floating diffusion node
161 capacitor
162 floating diffusion node
163 capacitor
165 extra "dangling" transistor gate 166 floating diffusion node
167 transistor gate
168 transistor gate
169 transistor gate
200 pixel
201 photodiode implants
202 photodiode implants
203 transfer gate
204 transfer gate
205 change-to-voltage conversion node
206 reset transistor
207 output transistor
208 row select transistor
209 output signal line
210 power supply voltage
211 surface pinning layer implant/pinned-photodiode
220 color filter material
221 color filter material
222 microlens
223 microlens
224 light rays
230 photo-generated charge (photodiode)
231 channel potential
232 channel potential
233 channel potential
234 photo-generated charge (photodiode)
240 output voltage curve
241 output voltage curve
242 higher gain curve
243 point
244 curve
300 image sensor
305 row decoder circuitry
308 photosensitive pixel
310 timing generator
315 analog-to-digital converter
320 integrated image processing
325 correlated double sampling (CDS) circuitry
400 digital camera

The invention claimed is:

1. A method for reading out an image signal, the method comprising:
providing a first photosensitive region and a second photosensitive region;
providing a first transfer gate coupled to transfer first image charge from the first photosensitive region and also providing a second transfer gate coupled to transfer second image charge from the second photosensitive region;
providing a common charge-to-voltage conversion region electrically connected to the first and second transfer gates;
providing a reset mechanism that resets the common charge-to-voltage conversion region;
transferring the first image charge from the first photosensitive element to the common charge-to-voltage conversion region at a first time by enabling the first transfer gate;
sampling a first voltage level generated by the first image charge on the common charge-to-voltage conversion region at a second time following the first time;
transferring the second image charge from the second photosensitive element by enabling the second transfer gate at a third time following the second time, wherein the second transfer gate has been disabled to hold the second image charge in the second photosensitive element from the first time to the third time; and
sampling a second voltage level on the common charge-to-voltage conversion region at a fourth time following the third time, wherein the first transfer gate is enabled during the fourth time.

2. The method as in claim 1 further comprising resetting the common charge-to-voltage conversion region between the second and third times.

3. The method as in claim 1 further comprising providing the first and second photosensitive regions with two different photosensitivities.

4. The method as in claim 3, wherein the second photosensitive region has a higher photosensitivity than the first photosensitive region.

5. The method as in claim 3 further comprising providing different size microlenses to provide the two different photosensitivities.

6. The method as in claim 1 further comprising providing at least two individual color filters for the first and second photosensitive regions.

7. The method as in claim 6 further comprising providing different spectral characteristics for each of the at least two individual color filters.

8. The method as in claim 1 further comprising providing the combination of at least two different size microlenses and at least two different spectral characteristics for the first and second photosensitive regions.

* * * * *